(12) United States Patent (10) Patent No.: US 8,269,144 B2
Kapoor et al. (45) Date of Patent: Sep. 18, 2012

(54) HIGH STRENGTH STICK ELECTRODE

(75) Inventors: Ashish Kapoor, Highland Heights, OH (US); Craig Dallam, University Heights, OH (US); Michael J. Morlock, Chesterland, OH (US)

(73) Assignee: Lincoln Global, Inc., City of Industry, CA (US)

( * ) Notice: Subject to any disclaimer, the term of this patent is extended or adjusted under 35 U.S.C. 154(b) by 1073 days.

(21) Appl. No.: 11/466,917

(22) Filed: Aug. 24, 2006

(65) Prior Publication Data

US 2007/0193995 A1 Aug. 23, 2007

Related U.S. Application Data

(63) Continuation-in-part of application No. 11/357,862, filed on Feb. 21, 2006.

(51) Int. Cl.
*B23K 35/22* (2006.01)

(52) U.S. Cl. .................................................. 219/146.1

(58) Field of Classification Search ................ 219/146.1, 219/137 WM, 146.24
See application file for complete search history.

(56) References Cited

U.S. PATENT DOCUMENTS

| | | | | |
|---|---|---|---|---|
| 2,871,118 | A | * | 1/1959 | Perkins et al. .................. 420/43 |
| 3,350,539 | A | | 10/1967 | Manz et al. |
| 3,656,943 | A | * | 4/1972 | Heuschkel ..................... 420/109 |
| 3,716,591 | A | | 2/1973 | Baybrook et al. |
| 3,745,322 | A | | 7/1973 | Ito et al. |
| 3,778,588 | A | * | 12/1973 | Bishel ....................... 219/146.52 |
| 3,902,039 | A | | 8/1975 | Lang |
| 3,919,519 | A | | 11/1975 | Peterson |
| 4,426,428 | A | * | 1/1984 | Kammer et al. .............. 428/561 |
| 4,721,837 | A | * | 1/1988 | Gamberg ...................... 219/69.1 |
| 5,192,851 | A | | 3/1993 | James et al. |
| 5,365,036 | A | | 11/1994 | Crockett et al. |
| 5,369,244 | A | | 11/1994 | Kulikowski et al. |
| 5,634,988 | A | | 6/1997 | Kurebayashi et al. |
| 5,744,782 | A | | 4/1998 | Sampath et al. |
| 6,110,301 | A | | 8/2000 | Singh et al. |
| 6,180,920 | B1 | | 1/2001 | Blankenship et al. |
| 6,188,037 | B1 | * | 2/2001 | Hamada et al. .................. 219/61 |
| 6,426,483 | B1 | | 7/2002 | Blankenship et al. |
| 6,953,508 | B2 | * | 10/2005 | Ikeda et al. .................... 148/320 |
| 2007/0193993 | A1 | | 8/2007 | Burt et al. |
| 2007/0251934 | A1 | * | 11/2007 | Kral et al. .................... 219/146.1 |

FOREIGN PATENT DOCUMENTS

| | | |
|---|---|---|
| AU | 2006202605 B2 | 9/2007 |
| BR | PI0602507-2 | 11/2007 |
| CA | 2231985 C | 5/2005 |
| CA | 2550558 A1 | 8/2007 |

(Continued)

OTHER PUBLICATIONS

All-Weld-Metal Design for AWS E10018M, E11018M and E12018M Type Electrodes [online], accessed via the Internet [retrieved on Dec. 24, 2009] URL: <https://www.aws.org/wj/supplement/june99/SURIAN.pdf>.* Stick Electrode Product Catalog—Lincoln Electric Jun. 2004.
IFW of U.S. Appl. No. 11/357,862 (Publication No. 20070193993 A1) Co-Pending Related Parent Application of instant application.

(Continued)

*Primary Examiner* — Henry Yuen
*Assistant Examiner* — Thien S Tran
(74) *Attorney, Agent, or Firm* — Perkins Coie LLP (57) ABSTRACT

A shielded metal arc welding electrode for depositing a high strength weld metal bead on a workpiece which satisfies the strength requirements under America Welding Society A5.5 standard's E11018M classification with no chromium added to the composition of the electrode.

26 Claims, 3 Drawing Sheets

FOREIGN PATENT DOCUMENTS

| | | | |
|---|---|---|---|
| CN | 101024261 | A | 8/2007 |
| EP | 1 226 897 | | 7/2002 |
| EP | 1361016 | A1 * | 11/2003 |
| EP | 1 818 131 | | 8/2007 |
| EP | 1820595 | A1 | 8/2007 |
| JP | 8 276293 | | 10/1996 |
| JP | 08-276293 | * | 10/1996 |
| JP | 2000 102893 | | 4/2000 |
| JP | 2001 129683 | | 5/2001 |
| MX | PA06014732 | A | 10/2008 |
| WO | WO 97/32684 | * | 9/1997 |
| WO | WO 02/12581 | | 2/2002 |

OTHER PUBLICATIONS

Examination Report issued in related Australian Patent Application No. 2007200924, Aug. 25, 2009, 2 pages (corresponds to U.S. Appl. No. 11/466,917).

Y, Ito, Nakanishi, Y. Komizo, "Cold cracking susceptibility of girth welding for arctic grade line pipe," Sep. 1982, vol. 4, No. 2, p. 110-113; Abstract & p. 110, accessed from http://www.springerlink.com/content/6328421667813r25/22 (3 pages).

Partial European Search Report dated Sep. 14, 2010 in counterpart European Patent Application No. EP 07 10 3527.

"ATOM ARCT T Tech Data Sheet", www.esab.com.

"HOBALLOY 11018M", Hobart Brothers catalog.

* cited by examiner

HIGH STRENGTH STICK ELECTRODE

PRIORITY

The present application is a continuation-in-part of U.S. application Ser. No. 11/357,862 filed Feb. 21, 2006, the entire disclosure of which is incorporated herein by reference.

FIELD OF THE INVENTION

The present invention relates to the art of electric arc welding and more particularly to a novel Shielded Metal Arc Welding (SMAW) for welding steel electrode that deposits metal on a workpiece with a yield strength in the general range of 85 ksi to 125 ksi with a reduced sensitivity of the yield strength to the cooling rate of the deposited molten metal, and to a high strength SMAW electrode which has a low amount of chromium in its composition.

BACKGROUND OF INVENTION

In many military applications as well as some commercial applications, welding is to be performed by a SMAW electrode in a manner to produce a high yield strength. The electrode used in these applications must produce a yield strength in the general range of 85 ksi to 125 ksi. To accomplish such high yield strength, the coating of the stick electrode must have substantial amounts of alloying agents, such as nickel, manganese and molybdenum. The yield and tensile strength for any given alloy are determined by the cooling rate, as it relates to the continuous cooling transformation curve (CCT) of the particular steel alloy. The strength of the weld metal bead as well as the cooling rate sensitivity relates to the composition, as well as the carbon content of the steel and the actual cooling rate for the molten and solidified weld metal. It has been found that the cooling rate changes drastically according to the thickness and preheat of the workpiece and the amount of electrical energy used in the shielded metal arc welding process. It is desirable to minimize the yield strength sensitivity to the different cooling rates, while maintaining the alloy composition of the weld metal so that the high yield strength in the range of 85 ksi to 125 ksi can be assured in the resulting weld. Consequently, there is a need to create a stick electrode that minimizes the cooling rate sensitivity so the resulting weld is within the high yield strength specification for both an extreme high cooling rate and an extreme low cooling rate.

Additionally, currently all high strength electrodes used for welding high strength steels, have chromium (Cr) added to the electrode composition to increase the tensile and yield strength of the weld. However, because Cr is added to the electrode composition, Cr is emitted as fume during the welding operation. This Cr emission can be hazardous, thus causing the Occupational Safety and Health Administration (OSHA) and American Welding Society (AWS) to mandate limits on the amount of hexavalent Cr present in the welding fumes. Therefore, there is a need for a welding electrode which is capable of being used for creating high strength welds, which has no Cr added to the electrode composition.

THE PRESENT INVENTION

There are two aspects of the invention, which are discussed in the present application, the first aspect relates to a shielded metal arc welding electrode that minimizes yield strength sensitivity to cooling rate, while obtaining a high yield strength weld metal deposit, and the second aspect relates to a high strength electrode which has no Cr intentionally added to the electrode composition so as to result in a low Cr weld deposit, with high strength.

The following discussion relates to the first aspect of the invention discussed in this application.

While minimizing the cooling rate sensitivity of the resulting weld metal, the electrode still meets the military specification on final yield strength. Thus, the electrode is within the applicable military specification and uses a novel alloy formulation. This formulation produces the lowest possible carbon equivalent in the weld metal deposit, while still meeting the minimum strength requirement when using the novel electrode to weld on a workpiece using welding parameters that create a low cooling rate. Such a welding operation results when the workpiece is relatively thin plates heated to a high interpass temperature, such as about 300° F. This weld has a low cooling rate. The novel electrode still created a weld metal having a yield strength in the specification limits of 85 ksi to 125 ksi. Thus, even at a low cooling rate, which inherently provides a minimum yield strength for the weld metal, the resulting weld metal using the present electrode is within the desired strength range. Consequently, the novel electrode of the present invention allows welding with a low cooling rate because the cooling rate sensitivity of the electrode is minimized. In a like manner, when a high cooling rate is used, the novel electrode still accomplishes high yield strength, but not excessively high yield strength. Thus, the present invention involves a novel electrode that obtains at least a minimum yield strength irrespective of low cooling rate created by a high temperature, thin workpiece welded with a high energy and less than a maximum yield strength for a cold workpiece welded at a low temperature thereby resulting in a high cooling rate.

In accordance with the present invention there is provided an electrode for depositing a high strength weld metal bead on a workpiece where the yield strength of the weld metal is between 85 ksi and 125 ksi, irrespective of the cooling rate. The electrode has 0.80-1.85% by weight manganese, 0.25-0.50% by weight of molybdenum, 1.25-2.5% by weight nickel and less than 0.07% by weight carbon. The relative ratio of carbon, manganese and molybdenum is adjusted to provide a carbon equivalent in the range of 0.17-0.30. Preferably, the carbon equivalent is in the range of 0.20-0.22. In this manner, the stick electrode minimizes the carbon equivalent, while using normal amounts of carbon, manganese and molybdenum to produce high strength weld metal. This electrode is used for military applications such as specification MIL-E-22200/10C. The core wire of the electrode has a diameter in the general range of 3/32-5/32 inch. The novel electrode has low cooling rate sensitivity so the strength of the weld metal is generally insensitive to the cooling rate. This property of the novel electrode is documented by using the electrode for both a hot, high heat input on a relatively thin workpiece, high energy process with a low cooling rate as well as a low current process on a thick workpiece with a low heat input that produces a high cooling rate. Both of these cooling rate extremes result in a weld metal within the desired high yield strength requirements of the applicable military specification. Thus, irrespective of a high cooling rate or a low cooling rate, the weld metal deposit using the novel stick electrode is within military specifications for yield strength. Consequently, irrespective of the workpiece and the welding parameters, the yield strength of the resulting weld metal still is within the range of about 88 ksi to 122 ksi.

The ability to minimize cooling rate sensitivity is realized by minimizing the carbon equivalent for the electrode, while still maintaining the alloying composition needed to obtain the high yield strength of the resulting weld metal. Carbon equivalent is defined by the Pcm formula which involves the carbon content, manganese content, the molybdenum content and the nickel content. Quantities of other alloy constituents are minimum and have a lesser impact on the calculated carbon equivalent. Carbon content is the strongest contributor to carbon equivalent. Since the present invention involves a steel alloy having larger amounts of manganese, molybdenum and nickel, these constituents are the primary factors with carbon for fixing the carbon equivalent. Using manganese, molybdenum and nickel allows the actual elemental carbon to be reduced to less than 0.050% by weight of the weld metal while still obtaining high yield strength associated with higher carbon alloys.

Carbon equivalent of the present invention is minimized so it is less than a given value whereby high strength caused by a high cooling rate is below the maximum allowable yield strength of the applicable military specification. Since carbon equivalent is affected only slightly by nickel, the two main elements to adjust the carbon equivalent and also required for a high yield strength weld are manganese and molybdenum. Manganese is a strong deoxidizer; therefore, manganese in the resulting weld metal alloy is reduced by the welding procedure. Consequently, the effect of the manganese on the resulting carbon equivalent is somewhat unpredictable. Recognizing this fact, the present invention emphasizes the addition of molybdenum and the reduction of manganese as they are coordinated to produce a low carbon equivalent. However, manganese cannot be completely eliminated from the electrode because it is necessary for deoxidizing the resulting weld metal. In other words, the invention involves a low amount of carbon together with controlling the amounts of manganese and molybdenum to produce a low carbon equivalent in the deposited weld metal without use of carbon. The cooling rate sensitivity of the resulting weld metal is reduced as the carbon equivalent is reduced. Manganese is included in the deposited weld metal to assure a minimum yield strength and then molybdenum is added to obtain the desired predictable low carbon equivalent. In this manner, the carbon equivalent is minimized, but the strength is retained at a level greater than 88 ksi. It has been found that the carbon equivalent should be in the general range of 0.18 to 0.30 and in one exemplary embodiment reduced to the range of 0.20 to 0.22. This low carbon equivalent is obtained by adjusting the ratio of manganese to molybdenum, so this ratio is in the general range of 2-7 to 1 and in one embodiment in the range of 3-4 to 1. This ratio produces the desired yield strength and a low carbon equivalent to reduce the cooling rate sensitivity of the resulting weld metal.

In another aspect of the invention, the carbon content of the weld metal is in the range of 0.03 to 0.05% by weight. This is a relatively low amount for a specification having a maximum of 0.07% carbon. By using a low amount of carbon and obtaining the carbon equivalent through controlled amounts of manganese and molybdenum, the carbon equivalent is selected to obtain the desired high yield strength. In accordance with the invention, the carbon equivalent is reduced by decreasing the carbon and controlling the ratio of manganese to molybdenum. Interpass heating of the workpiece was used to test the efficacy of the present invention; however, it may not be required when using an electrode formulated in accordance with the invention.

An aspect of the invention is a SMAW electrode for controlling the ratio of manganese to molybdenum in a deposited weld metal bead to a range of 2-7 to 1. This is combined with a low level of carbon where the carbon is less than 0.05% by weight of the weld metal. In this manner, the carbon equivalent in the weld metal is reduced to less than about 0.3; however, to minimize the carbon equivalent, it is reduced to the general range of 0.17 to 0.22. Minimum carbon equivalent while still using the desired alloy of the applicable military specification results in a high yield strength, even when the welding process, determined by the heat and workpiece, has a very low cooling rate.

Another aspect of the present invention is the provision of a method of welding with an SMAW electrode onto a workpiece. The electrode for depositing a weld metal bead having 0.80-1.85% by weight manganese, 0.25-0.50% by weight molybdenum and less than 0.07% by weight carbon with a carbon equivalent in the general range of 0.17-0.30. The carbon equivalent is to be minimized and is 0.20-0.22 in an embodiment of the present invention. This method involves melting the electrode with generated electrical energy in the heat input range of 30-60 kJ/in and moving the electrode along the workpiece as the electrode is melted and deposited onto the workpiece. The manganese to molybdenum ratio is in the range of 2-7 to 1. This invention also anticipates preheating of the workpiece to a temperature in the general range of 100° F. to 300° F. as required by the specification.

In the electrode of the present invention, the hardenability is primarily obtained through increased molybdenum, instead of manganese. Nickel and molybdenum are recovered predictably during welding. Molybdenum increases to the electrode are coordinated with manganese reductions to obtain a given yield strength for the resulting weld metal.

An electrode providing deposited weld metal meeting the applicable military specification has been tested under two extreme conditions. The first condition involves a hot weld with a low cooling rate conducted on a ¾ inch plate with a 300° F. interpass temperature and 55 kJ/in heat input in the flat welding position (1 G). The other extreme condition tested involves a cold weld with a high cooling rate on a 1.0 inch plate with a 125° F. interpass temperature and a 31 kJ/in heat input welded in the vertical welding position (3 G) using a vertical up progression. The two tests of extreme conditions show the benefit of using a low carbon equivalent for the deposited weld metal, while still maintaining the desired yield strength of the resulting weld metal. The weld strength constraints for the two extreme condition tests was a minimum permissible yield strength of 88 ksi and a maximum permissible yield strength was 122 ksi. These two tests were conducted using a data acquisition system controlling the heat input for each electrode to within 4.0 kJ/in of the target heat input, while the heat input along the pass was maintained within 2.0 kJ/in of the desired welding heat input. The two extreme condition tests confirmed that reducing the carbon equivalent of the weld metal decreases the effect of cooling rate upon the yield strength of the resulting weld metal. The weld metal maintained its alloy recipe as defined in the applicable military specification.

An object of the present invention is the provision of an SMAW electrode for use in an application where the yield strength of the deposited weld metal is to be between about 85 ksi and 125 ksi. The alloy composition of the electrode is maintained to obtain this yield strength in the weld metal; however, the manganese and molybdenum are proportionally adjusted to reduce and minimize the carbon equivalent of the weld metal deposited by the electrode. In this manner, the weld metal has a relatively low sensitivity to cooling rate and the cooling rate determined by the heat input and workpiece constraints does not cause the yield strength to deviate from the specification.

Yet another object of the above aspect of the present invention is the provision of a method using the electrode, as defined above, for the purpose of welding with various heat inputs and various workpiece constraints.

The following discussion now turns to the second aspect of the present invention.

This second aspect of the present invention relates to a high strength shielded metal arc welding (SMAW) electrode which satisfies at least the American Welding Society (AWS A5.5) E11018M classification specification for commercial applications, as well as the military specification MIL-E-22200/1F for military applications, but has no Cr additions to the electrode composition. An embodiment of this aspect of the present invention provides a weld strength which has a yield strength between 85 and 125 ksi, while another embodiment of this aspect of the invention provides a weld strength which exceeds 110 ksi ultimate tensile strength and between 98 to 110 ksi yield strength (0.2% YS), while having a low Cr content, due to no Cr additions to the electrode composition. Additionally, similar to the previously discussed embodiment, this embodiment of the invention minimizes the alloy and strength variation in the deposit through control of the carbon equivalent of the weld metal.

An embodiment of the present invention achieves a no-Cr deposit which satisfies the AWS A5.5 E11018M classification through a balance of other alloys in the weld deposit, including carbon (C), manganese (Mn), molybdenum (Mo), nickel (Ni) and vanadium (V).

These and other objects and advantages will become apparent from the following description taken together with the accompanying drawings.

BRIEF DESCRIPTION OF DRAWINGS

The advantages, nature and various additional features of the invention will appear more fully upon consideration of the illustrative embodiment of the invention which is schematically set forth in the figures, in which.

DISCUSSION OF EXEMPLARY EMBODIMENTS

As discussed above, the present application is directed to two aspects of the present invention. The discussion set forth directly below is directed to a first aspect of this invention, while the second aspect is discussed in more detail following.

First Aspect:

The first aspect of the present invention relates to a novel stick electrode having an alloying composition to deposit a weld metal defined by a military specification to produce a weld metal with a yield strength between 88 ksi and 122 ksi. This new electrode deposits a weld metal with reduced carbon equivalent as defined by the Pcm formula so the weld metal has a low sensitivity to variations in the cooling rates. The formula is:

$$Pcm = C + \frac{Si}{30} + \frac{Mn + Cu + Cr}{20} + \frac{Mo}{15} + \frac{Ni}{60} + 5B$$

Figure 1A:
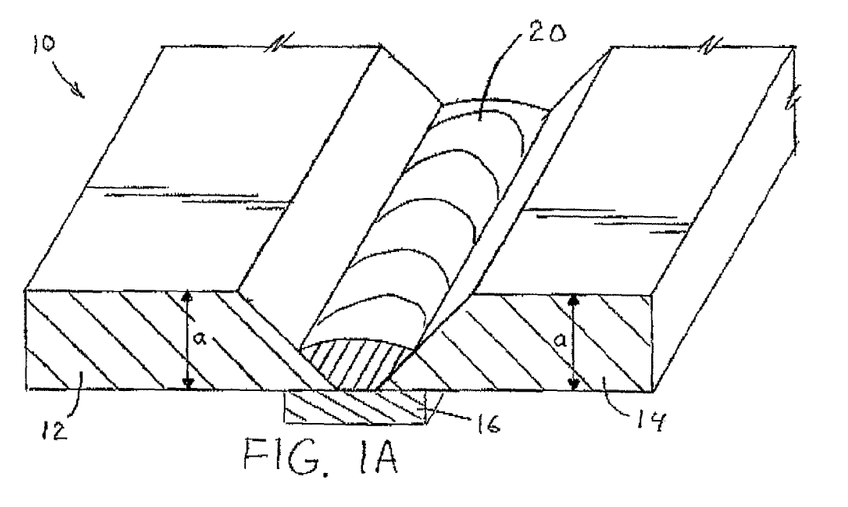
FIG. 1A is a partial cross-sectional view illustrating a test workpiece, in accordance with the first aspect of the invention, when using a cold plate with low heat input to produce a high cooling rate in the deposited weld metal.
Figure 1B:
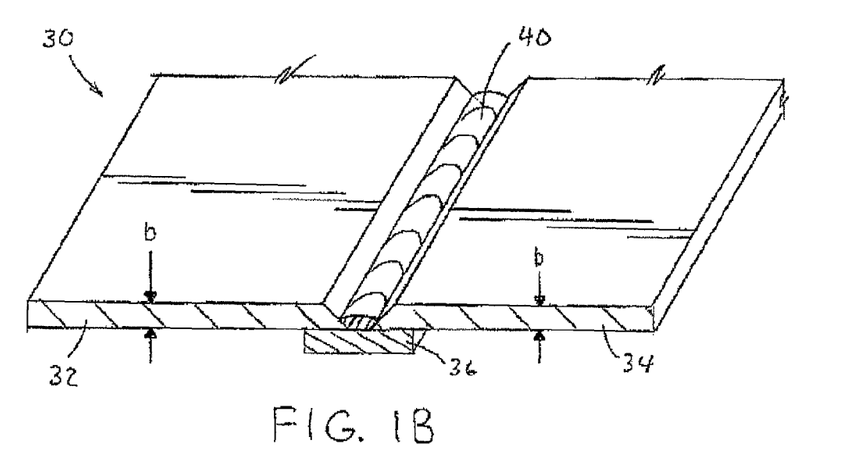
FIG. 1B is a view similar to FIG. 1A wherein the test workpiece is preheated and a high welding energy is used to produce a low cooling rate for the weld metal deposited by an electrode.

To test the efficacy of this new electrode, two extreme condition test procedures have been employed. The first extreme condition test procedure uses the schematic illustrated workpiece of FIG. 1A. In this test procedure, workpiece 10 with two plates 12, 14 has a thickness a and a backing plate 16. Thickness a is selected to be 1.0 inches. In this first test, an extreme welding process was performed wherein the workpiece is relatively thick and low welding heat is used to produce an extremely high cooling rate. Such a high cooling rate produces a high yield strength in a particular deposited steel having a given carbon content. Under the first extreme condition test, workpiece 10 had an interpass temperature of 125° F. A number of electrodes were tested with different carbon equivalents. A low heat input was used in the welding process for each electrode to deposit weld metal pass 20. The heat input used with this novel electrode was set to produce about 30 kJ/in. Thus, deposited weld metal pass 20 for each electrode was subjected to a high cooling rate. To test the novel electrode for the other extreme of cooling rate, a second test was conducted using workpiece 30, shown in FIG. 1B. In this second extreme cooling rate, a low cooling rate was obtained by pre-heating workpiece 30 formed from thin plates 32, 34, each having a thickness b, and a backing plate 36. In the second test thickness b was ¾ inch. Preheating workpiece 30 to 300° F. as the interpass temperature, was combined with a high welding heat of 51-55 kJ/in to lay weld metal pass 40 for several electrodes having different carbon equivalents. In each of the two extreme tests, either creating a high cooling rate as shown in FIG. 1A or a low cooling rate as shown in FIG. 1B, the heat input to the welding process was maintained within 4 kJ/in during the total welding process. These tests used several ⅛ inch diameter electrodes constructed in accordance with the present invention and having the composition falling in the percentage shown in Table 1.

TABLE 1

| | Hot Plate Std Dev | Average | | Cold Plate Std Dev | Average | Mil. Spec |
|---|---|---|---|---|---|---|
| % B | 0.000 | 0.000 | % B | 0.000 | 0.000 | |
| % C | 0.004 | 0.042 | % C | 0.002 | 0.046 | 0.07 Max |
| % Cr | 0.0112 | 0.080 | % Cr | 0.005 | 0.061 | 0.4 Max |
| % Cu | 0.015 | 0.030 | % Cu | 0.015 | 0.032 | |
| % Mn | 0.047 | 1.493 | % Mn | 0.058 | 1.608 | 0.80-1.85 |
| % Mo | 0.019 | 0.416 | % Mo | 0.014 | 0.422 | 0.25-0.5 |
| % Ni | 0.055 | 2.219 | % Ni | 0.031 | 2.217 | 1.25-2.5 |
| % P | 0.003 | 0.017 | % P | 0.003 | 0.016 | .025 Max |
| % Si | 0.027 | 0.395 | % Si | 0.031 | 0.469 | 0.6 Max |
| % S | 0.002 | 0.006 | % S | 0.001 | 0.007 | 0.017 Max |
| % V | 0.000 | 0.008 | % V | 0.000 | 0.008 | 0.05 Max |
| $C_{eq}$ | 0.007 | 0.204 | $C_{eq}$ | 0.007 | 0.214 | n/a |

In the electrodes used for the two extreme condition tests, the carbon content is maintained relatively low and it is in the range of 0.03-0.06 and in one embodiment is in the range of 0.04-0.05. The ratio of manganese to molybdenum in the electrode is maintained in the range of 4-8 to 1. This gives a weld metal ratio of about 2-7 to 1. The manganese and molybdenum affect the carbon equivalent of the alloy forming weld metal 20, 40. Manganese is somewhat volatile and is partially consumed to deoxidize the weld metal; consequently, in the present invention manganese is reduced and molybdenum is increased within the specification as set forth in Table 1. The two extreme condition tests set forth in FIGS. 1A, 1B to demonstrate embodiments of the present invention, are performed many times using weight percentages of manganese and molybdenum that vary slightly and different carbon equivalents of the weld metal. The carbon equivalent is determined by the Pcm formula, wherein the main constituents of the specified alloy contributing to the carbon equivalent are carbon, manganese and molybdenum and, to a lesser extent, nickel. The invention involves low carbon in the weld metal and the carbon equivalent controlled by manganese and molybdenum.

In calculating the carbon equivalent for the alloy of weld metal pass 20, 40, the amount of nickel has only ¼ of the impact to carbon equivalent as does molybdenum. Thus, in conducting the series of tests on many electrodes to determine the yield strength of weld metal 20, 40 for different carbon equivalents, the amount of manganese, molybdenum and nickel are adjusted in accordance within the standard recipe. This adjustment must maintain these constituents within the determined specification. The ratio of manganese to molybdenum is reduced to the range of 2-7 to 1. This range of ratios elevates the impact of molybdenum to maintain better consistency for the calculated carbon equivalent of successive electrode used in performing the tests for the extreme high cooling rate procedure of FIG. 1A or the extreme low cooling rate procedure of FIG. 1B. The adjustment of manganese, molybdenum and nickel of the electrodes are within the ranges set forth in Table 2 for different sized electrodes.

TABLE 2

| | Weight Percent of Electrode | | | | | |
|---|---|---|---|---|---|---|
| | 3/32" | | 1/8" | | 5/32" | |
| | Min. | Max. | Min. | Max. | Min. | Max. |
| C | 0.032 | 0.045 | 0.035 | 0.048 | 0.037 | 0.052 |
| Mn | 1.83 | 2.16 | 1.85 | 2.15 | 1.93 | 2.24 |
| Ni | 1.54 | 1.69 | 1.50 | 1.66 | 1.56 | 1.73 |
| Mo | 0.28 | 0.35 | 0.27 | 0.35 | 0.28 | 0.37 |

The minimum weight percent of an electrode, according to an embodiment of the invention, was calculated using the minimum specifications for the alloys used in the coating and the minimum specifications for the cored electrode and the minimum % coating allowed. They were rounded down to the next 0.01%. The other elements for 3/32 inch and 5/32 inch electrodes are similar to the amounts disclosed in Table 1.

The maximum weight percent of an embodiment of an electrode was calculated using the maximum specifications for the alloys used in the coating and the maximum specifications for the cored electrode and the maximum % coating allowed. They were rounded up to the next 0.01%.

Figure 2:
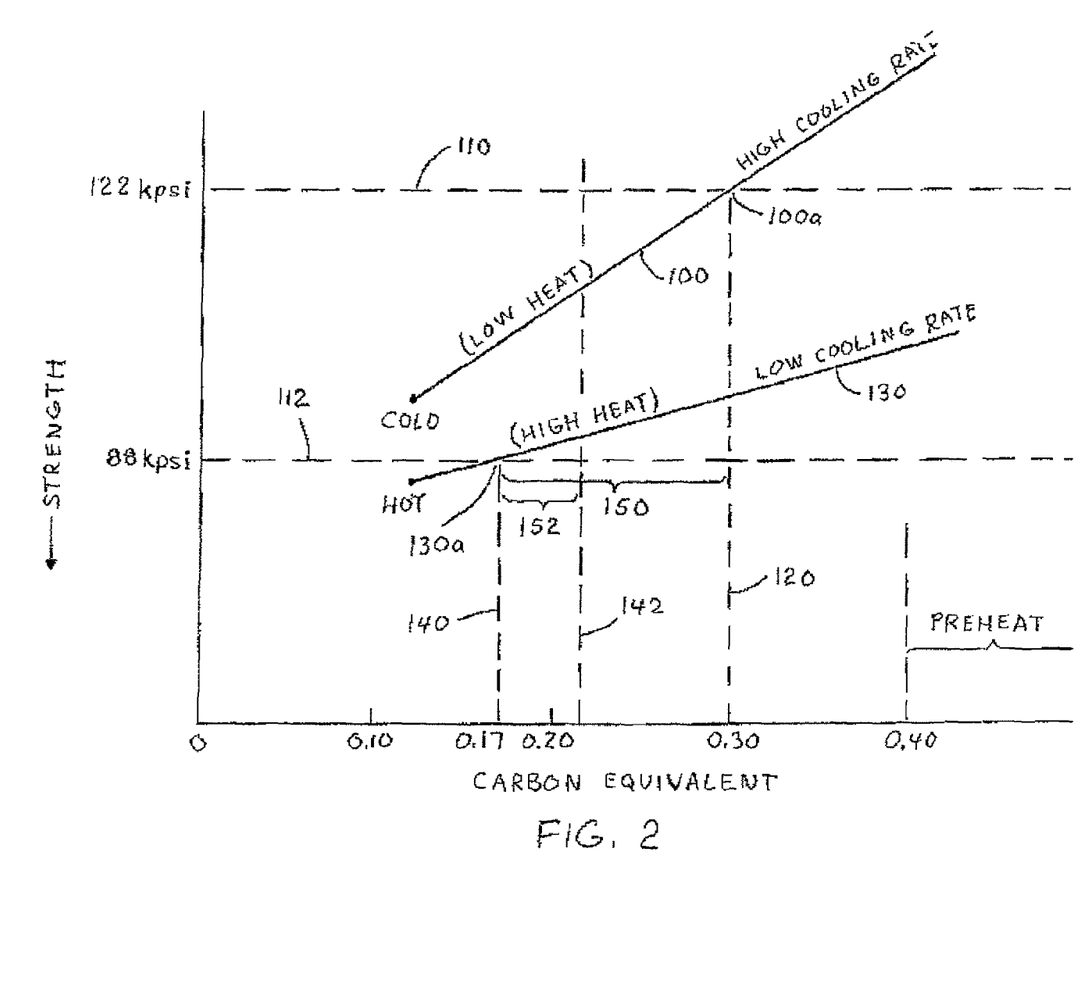
FIG. 2 is a graph of the carbon equivalent related to yield strength of the weld metal for several electrodes used to perform the two tests conducted on electrodes constructed in accordance with either aspect of the present invention showing the effect of reducing the carbon equivalent, a parameter that reduces the sensitivity of the weld metal to cooling rate.

When adjusting manganese and molybdenum levels of the electrode within ranges shown in Table 2 the manganese to molybdenum ratio maintained in the weld deposit is in the range of about 2-7 to 1, and in another embodiment is in the range of about 3-4 to 1. Tests on several such electrodes were conducted with several carbon rates using a very high cooling rate or a very low cooling rate. The tests of such electrodes conducted at extreme low cooling rate were each evaluated by testing the yield strength and then measuring the constituents of each individual weld metal of each test. The average percent by weight and the standard deviation thereof are set forth on the left two columns of Table 1. The low cooling rate test conducted as illustrated in FIG. 1B had the average electrode composition and standard deviation set forth in the next column of Table 1. These percentages must be within the military specification stated in the last column of Table 1. Each of the tests involved an electrode adjusted to change the carbon equivalent of the weld metal to allow construction of the graph shown in FIG. 2 which is the measured yield strength for the various test electrode having different adjusted carbon equivalents. Tests on several electrodes were conducted in accordance with the procedure explained using the workpiece of FIG. 1A. The tests using several carbon equivalents produced the yield strength line 100 intersected high level 110 (122 ksi) at point 100a as shown in FIG. 2. This point 100a corresponded to a carbon equivalent in the general area of 0.30 as indicated by line 120. The test conducted using the procedure set forth in FIG. 1B was used to generate curve 130 intersecting low level yield strength 112 at point 130a. The curves 100, 130 of FIG. 2 are represented as straight lines; however, that is to simplify the basic concept that carbon equivalents between two levels, such as 0.17 at line 140 and 0.30 at line 120 still maintain yield strength within the military specification.

In accordance with the invention, the carbon equivalent of the weld metal is lower than an upper level, such as 0.30. Consequently, an embodiment of the invention can be practiced with a carbon equivalent having the range shown as item 150. An additional embodiment involves minimizing the carbon equivalent. For example, the carbon equivalent of the electrode is controlled to be about 0.20 to 0.22. The carbon equivalent in practicing the invention can be reduced to even a lower level, such as about 0.17 or 0.18 as represented by the line 140. In a further embodiment, the range of the carbon equivalent is between line 140 and line 142 of the graph shown in FIG. 2. Thus, the invention involves an SMAW electrode within the composition required to obtain a yield strength in the weld metal between about 88 ksi, level 112 and 122 ksi (level 110) with the manganese and molybdenum adjusted to produce a low level carbon equivalent of the weld metal which is less than a high level such as 0.30. In another embodiment, the level is about 0.17-0.22. To decrease the uncertainty of the carbon equivalent for the electrode, the ratio of manganese to molybdenum in the electrode is in the range of 2-7 to 1 and, in a further embodiment, between 3-4 to 1. Thus, manganese is decreased and molybdenum is increased. Carbon itself in the electrode and weld metal is maintained at a low level, such as less than 0.06 and, in an additional embodiment, in the general range of 0.04 to 0.06. This defines the constraints for the SMAW electrode constructed in accordance with an embodiment of the present invention and the deposited weld metal. The average yield strength, tensile strength and elongation for the deposited weld metal by many electrodes obtained by the two extreme condition tests of FIGS. 1A, 1B are set forth in Table 3.

TABLE 3

| | Average |
|---|---|
| FIG. 1B Tests (Curve 130) | |
| Yield Strength 0.2% Offset Method (ksi) | 93 |
| Tensile Strength (ksi) | 104 |
| Elongation (%) (2 in. Gage Length) | 24 |
| FIG. 1A Tests (Curve 100) | |
| Yield Strength 0.2% Offset Method (ksi) | 113 |

TABLE 3-continued

| | Average |
|---|---|
| Tensile Strength (ksi) | 119 |
| Elongation(%) (2 in. Gage Length) | 20 |

Electrodes according to this aspect of the present invention satisfy the specification for E10718M electrodes, and meet the necessary strength requirements for these electrodes.

In producing the SMAW electrodes, of the first aspect of the invention, for conducting the tests resulting in curves 100, 103 in FIG. 2, the metal alloy for the deposited weld metal is selected to be within the specification. The amount of manganese is reduced to an amount which will still guarantee an elevated yield strength of 88 ksi. Then the amount of molybdenum is adjusted so the ratio of manganese to molybdenum in the deposit is in the range of 2-7 to 1 and may be in the range of 3-4 to 1. The ratio of manganese to molybdenum in the electrode is generally 5-8 to 1. Molybdenum is employed to adjust the chemical equivalent using the Pcm formula emphasizing manganese, molybdenum and nickel as presented in Table 2. The carbon equivalent of the weld metal is in the range of 0.15-0.35, i.e. at 0.20 to 0.22.

As will be discussed in further detail below, an embodiment of the second aspect of the present invention provides an electrode which satisfies both military and commercial strength requirements, but has no added chromium. Military Specifications allow up to 0.40% chromium in the weld deposit, but the electrodes according to this second aspect of the present invention result in weld deposits having 0.20% or less of Cr. A further embodiment results in a weld deposit of 0.10% or less of Cr, and another embodiment results in a weld deposit of 0.06% or less of Cr. Because, in this aspect of the present invention, no chromium is intentionally added to the electrode, the levels of chromium within the electrode are a result of transient or tramp chromium present in some of the other components used in the manufacture of the electrode, for example in the ferro-alloys such as iron powder. Such a low level of chromium ensures that the welding plume or fumes are more likely to comply with current OSHA safety guidelines on the hexavalent Cr Personal Exposure Limit (PEL), while at the same time achieving high strength welds. Chromium can also be introduced into the weld metal through base metal dilution Returning now to the first aspect of the present invention, after the electrode alloy has been formulated and the electrode has been made, two electrodes with the same carbon equivalent are tested in the two extreme cooling rate conditions explained in connection with FIGS. 1A, 1B. The two electrodes with the same equivalent are then tested in succession and are at the two extremes to generate curves 100, 130 as shown in FIG. 2. This test procedure illustrates the advantage of the present invention where the carbon equivalent of the weld metal is reduced to minimize the cooling rate sensitivity and still obtain the necessary yield strength for the specification to which the electrode is being applied. In an electrode of the present invention, a range of carbon is 0.03 to 0.06, of manganese is 1.80 to 2.30 and of molybdenum is 0.25 to 0.40. These are percentages by weight of the electrode. The carbon equivalent of the weld metal can be 0.20-0.22. After testing, embodiments of the electrodes are manufactured using the formulations of Table 1 and the ranges listed above. This procedure produces an electrode depositing a weld metal having low cooling rate sensitivity as established by the data contained in the graph of FIG. 2 and the properties disclosed in Table 3.

Using electrodes constructed in accordance with the invention, the weld metal deposit as compared to the Military Specification is provided in Table 4.

TABLE 4

| | Weight Percent of Weld Deposit | | | | | | | |
|---|---|---|---|---|---|---|---|---|
| | Military Spec. | | 3/32" | | 1/8" | | 5/32" | |
| | Min. | Max. | Min. | Max. | Min. | Max. | Min. | Max. |
| C | N/A | 0.07 | 0.034 | 0.045 | 0.034 | 0.048 | 0.036 | 0.050 |
| Mn | 0.80 | 1.85 | 1.20 | 1.62 | 1.26 | 1.72 | 1.30 | 1.75 |
| Ni | 1.25 | 2.5 | 2.20 | 2.50 | 2.20 | 2.50 | 2.20 | 2.50 |
| Mo | 0.25 | 0.50 | 0.42 | 0.50 | 0.42 | 0.50 | 0.42 | 0.50 |

The ranges of carbon, manganese, nickel and molybdenum of Table 4 represent an embodiment of the present invention. Further, the ranges of these components for an additional embodiment of the invention are set forth in Table 5.

TABLE 5

| | Target Weight Percent of Weld Deposit | | | | | |
|---|---|---|---|---|---|---|
| | 3/32" | | 1/8" | | 5/32" | |
| | Min. | Max. | Min. | Max. | Min. | Max. |
| C | 0.037 | 0.042 | 0.037 | 0.045 | 0.039 | 0.047 |
| Mn | 1.27 | 1.55 | 1.33 | 1.65 | 1.37 | 1.68 |
| Ni | 2.10 | 2.45 | 2.10 | 2.45 | 2.10 | 2.45 |
| Mo | 0.42 | 0.50 | 0.42 | 0.50 | 0.42 | 0.50 |

Thus, this aspect of the present invention relates to an SMAW electrode for high yield strength, which maintains the desired metallurgical constraints for the electrode while reducing its sensitivity to changes in cooling rates. Thus, irrespective of the extreme cooling rates by various heat inputs and various types of workpieces and temperatures thereof, the electrode still maintains a yield strength within the desired range which range in the present invention is between about 85 ksi and 125 ksi.

Second Aspect:

As discussed above, the second aspect of the present invention relates to electrodes which provide a yield strength range between 85 and 125 ksi, and in a further embodiment between 98 and 110 ksi (in accordance with military and AWS specifications), to which no chromium has been added, but which satisfy the specifications for both military and commercial applications. Specifically the MIL-E-22200/1F and E11018M electrode, as per AWS A5.5, specifications. Because of this, the level of chromium in a weld deposit made by an electrode of in accordance with this second aspect of the present invention is 0.20% or less, and with a further embodiment can be 0.10% or less, and in another embodiment is 0.06% or less.

As indicated previously, chromium has been historically added to welding electrodes to aid in increasing the strength (i.e. yield and tensile) of a weld deposit. However, because the presence of chromium in the welding plume might render the fumes hazardous, it is desirable, and in some instances required, to keep chromium levels low. The present invention achieves this, without sacrificing strength.

Figure 3:
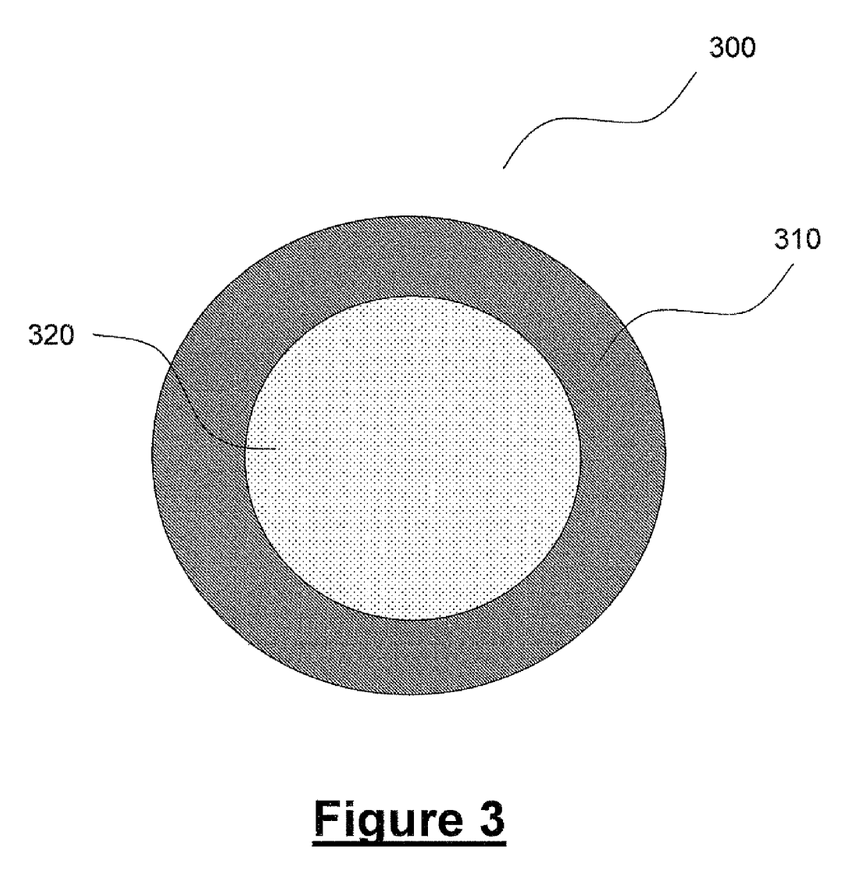
FIG. 3 is a cross-section of an embodiment of an electrode according to an embodiment of the second aspect of the present invention.

FIG. 3 shows a cross-sectional of an exemplary embodiment of an electrode 300 of the present invention. The electrode 300 contains an electrode coating 310 and a core wire 320. It is noted that although this is a typical construction of an electrode used for welding, the present invention is not limited to this embodiment and the electrode of the present invention may be made of a single solid component or may have core wire surrounded by more than one coating layer or even possibly be a hollow core wire filled with flux. Additionally, the electrode of the present invention can be made in various sizes, for various welding applications. Sizes include, but are not limited to ³⁄₃₂", ⅛", ⁵⁄₃₂" and ³⁄₁₆".

Further, in an embodiment of the present invention, the electrode coating 310 can be in the range of about 32 to about 48% of the electrode 300 as a whole, on a weight basis.

The following Table 6, sets forth the ranges of the various components of the electrode composition of the present invention, in weight % of the electrode.

TABLE 6

| Element | Range % (by weight) |
|---|---|
| C | 0.8 to 1.5 |
| Mg | 0 to 0.2 |
| Si | 1.9 to 3.0 |
| Zr | 0.4 to 1.1 |
| Al | 0.01 to 0.1 |
| Ti | 0.9 to 1.5 |
| Ca | 5.4 to 8.0 |
| F | 2.5 to 3.5 |
| Ni | 1.2 to 2.0 |
| Mo | 0.01 to 0.5 |
| Mn | 1.5 to 2.0 |
| K | 0.2 to 0.4 |
| Li | 0.01 to 0.05 |
| Na | 0.1 to 0.3 |
| Cr* | — |
| Fe & others | Remaining % |

*Amount of Cr is due to tramp amounts of Cr and is not intentionally added.

It is noted that in various embodiments of the present invention, other elements may be present within the electrode, in small amounts, without altering the overall benefits of the invention. Examples include: S, P, N, Cu, V and Sn.

In an embodiment of the present invention, no chromium is intentionally added to the electrode composition, and the amount of chromium present is a result of tramp amounts of chromium from some of the other components. Additionally, it is noted that above ranges of the present invention may be achieved by any known means and the use of known and commonly used materials, such as calcium carbonate. Stated differently, the element ranges disclosed herein merely represent the amounts of each individual element in the electrode, and the present application is not intended to limit, in any way, the source of the elements during manufacture.

Further, it is also contemplated that elements which are used primarily for the manufacturability of the electrode, such as K, Li, Na, Al, Zr and Mg, can be replaced by other known elements which allow for feasible manufacture of the electrode of the present invention, and at the same time could be used to achieve the claimed mechanical properties.

The data in the following Table 7 provides the further ranges of the electrode components, for embodiments of the electrodes which have different sizes, and a different coating percentage.

TABLE 7

| | ³⁄₃₂" 42 to 48% coating | ⅛" 37.5 to 43.5% coating | ⁵⁄₃₂" 34 to 39% coating | ³⁄₁₆" 32 to 38% coating |
|---|---|---|---|---|
| C | 1.1 to 1.4 | 1.0 to 1.3 | 0.9 to 1.2 | 0.8 to 1.1 |
| Mg | 0 to 0.16 | 0 to 0.14 | 0 to 0.13 | 0 to 0.12 |
| Si | 2.3 to 2.9 | 2.0 to 2.7 | 1.9 to 2.5 | 1.9 to 2.5 |

TABLE 7-continued

| | ³⁄₃₂" 42 to 48% coating | ⅛" 37.5 to 43.5% coating | ⁵⁄₃₂" 34 to 39% coating | ³⁄₁₆" 32 to 38% coating |
|---|---|---|---|---|
| Zr | 0.6 to 1.1 | 0.5 to 1.0 | 0.5 to 0.9 | 0.4 to 0.9 |
| Al | 0.01 to 0.07 | 0.01 to 0.06 | 0.01 to 0.06 | 0.01 to 0.05 |
| Ti | 1.2 to 1.4 | 1.1 to 1.3 | 1.0 to 1.2 | 0.9 to 1.1 |
| Ca | 7.0 to 7.9 | 6.3 to 7.1 | 5.6 to 6.3 | 5.4 to 6.2 |
| F | 3.2 to 3.5 | 2.9 to 3.2 | 2.5 to 2.9 | 2.5 to 2.8 |
| Ni | 1.2 to 1.5 | 1.3 to 1.5 | 1.4 to 1.7 | 1.6 to 1.9 |
| Mo | 0.2 to 0.3 | 0 to 0.1 | 0.3 to 0.4 | 0.3 to 0.4 |
| Mn | 1.6 to 1.9 | 1.6 to 2.0 | 1.6 to 1.9 | 1.6 to 2.0 |
| K | 0.2 to 0.4 | 0.2 to 0.3 | 0.2 to 0.3 | 0.2 to 0.3 |
| Li | 0.03 to 0.04 | 0.02 to 0.03 | 0.02 to 0.03 | 0.02 to 0.03 |
| Na | 0.25 to 0.30 | 0.22 to 0.27 | 0.20 to 0.24 | 0.19 to 0.23 |
| Cr* | — | — | — | — |
| Fe & others | Remaining % | Remaining % | Remaining % | Remaining % |

*Amount of Cr is due to tramp amounts of Cr and is not intentionally added.

It is noted that in various embodiments of the present invention, other elements may be present within the electrode, in small amounts, without altering the overall benefits of the invention. Examples include: S, P, N, Cu, V and Sn.

As shown above, Tables 6 and 7 show the overall elemental composition of an electrode according to the invention. The present invention is not limited to having the individual elements in any one component of an electrode, i.e. the coating 310 or the core wire 320. The above tables only provide the overall composition of the electrode 300. Additionally, it is also recognized that the various ranges discussed above for the various elements, in Tables 6 and 7, may be altered slightly or newer elements like Nb, V and Cu may be added while maintaining the required strength of an electrode. Further, as shown above, chromium is not intentionally added to the composition but the low amounts of chromium present result from tramp amounts which may be present in other materials used to manufacture the electrode 300.

As shown in FIG. 3, the electrode 300 can be made up of a coating 310 and a wire core 320. In an embodiment of the present invention, the coating 310 contains certain amounts of the required elements, and the core 320 contains remaining portions of the components. The following Tables 8 and 9 are similar to the above Tables 6 and 7, except that they are directed to the composition of the electrode coating 310 of the present invention. Table 8 sets forth a coating composition for the present invention generally, whereas Table 9 is directed to embodiments for electrodes of different sizes Further, the percentages set forth in each of these tables is % weight of the coating.

As with Tables 6 and 7, no chromium is intentionally added to the electrode coating composition, and the amount of chromium present is a result of tramp amounts of chromium from some of the other components. Additionally, it is noted that the above ranges of the present invention may be achieved by any known means and the use of known and commonly used materials, such as calcium carbonate. Stated differently, the element ranges disclosed herein merely represent the amounts of each individual element in the electrode, and the present application is not intended to limit, in any way, the source of the elements during manufacture.

TABLE 8

| Coating Element | Range % (by weight) |
|---|---|
| C | 2.5 to 3.0 |
| Mg | 0 to 0.5 |

TABLE 8-continued

| Coating Element | Range % (by weight) |
| --- | --- |
| Si | 5.0 to 7.0 |
| Zr | 1.0 to 2.5 |
| Al | 0.03 to 0.2 |
| Ti | 2.5 to 3.2 |
| Ca | 15.5 to 17.5 |
| F | 7.0 to 8.0 |
| Ni | 2.75 to 5.0 |
| Mo | 0.5 to 1.2 |
| Mn | 3.0 to 4.5 |
| K | 0.5 to 0.8 |
| Li | 0.05 to 0.1 |
| Na | 0.5 to 0.75 |
| Cr* | — |
| Fe & others | Remaining % |

*Amount of Cr is due to tramp amounts of Cr and is not intentionally added.

As with Tables 6 and 7, it is contemplated that elements which are used primarily for the manufacturability of the electrode coating, such as K, Li, Na, Al, Zr and Mg, can be replaced by other known elements which allow for feasible manufacture of the electrode of the present invention.

The data in the following Table 9 provides the further ranges of the electrode coating components, for embodiments of the electrodes which have different sizes.

TABLE 9

| | 3/32" | 1/8" | 5/32" | 3/16" |
| --- | --- | --- | --- | --- |
| C | 2.5 to 2.9 | 2.5 to 2.9 | 2.5 to 3.0 | 2.5 to 3.0 |
| Mg | 0 to 0.34 | 0 to 0.34 | 0 to 0.34 | 0 to 0.34 |
| Si | 5.2 to 6.3 | 5.2 to 6.3 | 5.6 to 6.7 | 5.7 to 6.8 |
| Zr | 1.4 to 2.3 | 1.4 to 2.3 | 1.4 to 2.3 | 1.4 to 2.3 |
| Al | 0.03 to 0.13 | 0.03 to 0.13 | 0.03 to 0.13 | 0.03 to 0.13 |
| Ti | 2.8 to 3.1 | 2.8 to 3.1 | 2.8 to 3.1 | 2.8 to 3.1 |
| Ca | 16.0 to 17.1 | 16.0 to 17.1 | 16.0 to 17.1 | 16.0 to 17.1 |
| F | 7.3 to 7.6 | 7.3 to 7.6 | 7.3 to 7.6 | 7.3 to 7.6 |
| Ni | 2.9 to 3.0 | 3.2 to 3.4 | 4.2 to 4.4 | 4.8 to 5.0 |
| Mo | 0.5 to 0.7 | 0.6 to 0.8 | 0.8 to 1.0 | 0.9 to 1.1 |
| Mn | 3.1 to 3.4 | 3.5 to 3.9 | 3.8 to 4.1 | 4.0 to 4.4 |
| K | 0.6 to 0.7 | 0.6 to 0.7 | 0.6 to 0.7 | 0.6 to 0.7 |
| Li | 0.06 to 0.08 | 0.06 to 0.08 | 0.06 to 0.08 | 0.06 to 0.08 |
| Na | 0.5 to 0.7 | 0.5 to 0.7 | 0.5 to 0.7 | 0.5 to 0.7 |
| Cr* | — | — | — | — |
| Fe & others | % remaining | % remaining | % remaining | % remaining |

*Amount of Cr is due to tramp amounts of Cr and is not intentionally added.

Additionally, it is recognized that the various ranges discussed above for the various elements may be altered slightly, or newer elements like Nb, V and Cu may be added, while maintaining the required strength of an electrode. Further, as shown above, chromium is not intentionally added to the composition.

The above tables are directed to the composition of the electrode coating 310 of the present invention, and the following Table 10 shows components for a core wire 320 according to an embodiment of the invention. The following core wire may be used with the coating compositions set forth above. Additionally, the following percentages are % by weight of the core wire.

TABLE 10

| Core Wire Element | Range % (by weight) |
| --- | --- |
| C | 0.06 to 0.08 |
| Si | 0 to 0.03 |
| Al | 0 to 0.012 |
| Ti | 0 to 0.01 |
| Ca | 0 to 0.003 |
| Ni | 0 to 0.05 |
| Mo | 0 to 0.02 |
| Mn | 0.45 to 0.55 |
| Cr* | — |
| Fe & others | Remaining % |

*Amount of Cr is due to tramp amounts of Cr and is not intentionally added.

It is noted that in various embodiments of the present invention, other elements may be present within the electrode, in small amounts, without altering the overall benefits of the invention. Examples include: S, P, N, Cu, V and Sn.

It is further noted that the present invention is not limited to having the coating 310 and the core wire 320 with the % of components as set forth above in Tables 8 through 10, as the various elements used in the overall electrode 300 can be distributed differently between the coating 310 and the core 320, as long as the overall percentages for the electrode 300, or the chemical composition of the weld deposit, are satisfied.

When using the electrodes according to the present invention to achieve the desired weld strength requirements according to at least the AWS E11018M classification, the heat input during welding should be controlled. Controlling the heat input (KJ/in) will aid in allowing the weld strength to achieve the desired characteristics. In an embodiment of the present invention, the heat input is in the range of about 35 to about 55 KJ/in. Further, because the present invention contemplates electrodes of different electrode diameters, the heat input for the electrodes may vary depending on the size of the electrode, to achieve optimum strength results. The following Table 11, provides typical heat input ranges for electrodes of different sizes, according to an embodiment of the present invention.

TABLE 11

| Electrode Size | Range (KJ/in) | Exemplary Embodiment (KJ/in) |
| --- | --- | --- |
| 3/32" | 30 to 40 | About 35 |
| 1/8" | 35 to 45 | About 40 |
| 5/32" | 45 to 60 | About 50 |
| 3/16" | 50 to 60 | About 55 |

Another novel aspect of the present invention is the overall weld deposit left behind when the welding operation is complete. Specifically, because no chromium is added to the electrode composition, little chromium is emitted in the welding fumes and ends up in the weld deposit. Thus, because of the disclosed composition of the welding electrode and the balance of the elements, strength of the weld is not sacrificed, and it is possible to satisfy the requirements of the AWS E11018M classification without the use of chromium.

The following Table 12 sets forth the weld deposit composition according to an embodiment of the present invention, when an electrode of the present invention is used for the weld. The weld strength satisfies at least the AWS E11018M classification. In one embodiment, the weld has a yield strength between 85 and 125 ksi, and in another embodiment, the weld has an ultimate tensile strength (UTS) of at least 110 ksi and a 0.2% yield strength between 98 and 110 ksi. Again, this is achieved with little or no amounts of chromium in the weld. Further, the following component percentages are based on an undiluted weld deposit.

TABLE 12

| Weld Deposit element | % |
|---|---|
| C | 0.04 to 0.06 |
| Cr* | 0 to 0.2 |
| Cu | 0.030 to 0.065 |
| Mn | 1.50 to 2.25 |
| Mo | 0.35 to 0.50 |
| N | 0.005 to 0.030 |
| Nb | 0.003 to 0.007 |
| Ni | 1.75 to 2.75 |
| P | 0.01 to 0.02 |
| S | 0.005 to 0.010 |
| Si | 0.30 to 0.75 |
| V | 0.005 to 0.010 |

*Amount of Cr is due to tramp amounts of Cr and is not intentionally added to electrode.

It is noted that additional elements may be present in the weld deposit, which do not affect the overall benefits of the present invention. Examples include: Al, B, Ca, Co, Sn, Ti, Zr, and O.

The data in the following Table 13 provides the further ranges of the undiluted weld deposit elements, when used with embodiments of electrodes of the present invention which have different sizes.

TABLE 13

|   | 3/32"<br>42 to 48%<br>coating | 1/8"<br>37.5 to 43.5%<br>coating | 5/32"<br>33 to 39%<br>coating | 3/16"<br>32 to 38%<br>coating |
|---|---|---|---|---|
| C | 0.04 to 0.06 | 0.04 to 0.06 | 0.04 to 0.06 | 0.04 to 0.06 |
| Cr* | 0 to 0.20 | 0 to 0.20 | 0 to 0.20 | 0 to 0.20 |
| Cu | 0.04 to 0.06 | 0.04 to 0.06 | 0.04 to 0.06 | 0.04 to 0.06 |
| Mn | 1.5 to 1.7 | 1.6 to 1.8 | 1.6 to 1.8 | 1.6 to 1.8 |
| Mo | 0.35 to 0.50 | 0.35 to 0.50 | 0.40 to 0.50 | 0.45 to 0.50 |
| N | 0.005 to 0.020 | 0.005 to 0.020 | 0.005 to 0.020 | 0.005 to 0.020 |
| Nb | 0.003 to 0.005 | 0.003 to 0.005 | 0.003 to 0.005 | 0.003 to 0.005 |
| Ni | 2.0 to 2.4 | 2.0 to 2.4 | 2.2 to 2.4 | 2.3 to 2.4 |
| P | 0.01 to 0.02 | 0.01 to 0.02 | 0.01 to 0.02 | 0.01 to 0.02 |
| S | 0.005 to 0.010 | 0.005 to 0.010 | 0.005 to 0.010 | 0.005 to 0.010 |
| Si | 0.30 to 0.50 | 0.40 to 0.50 | 0.40 to 0.50 | 0.40 to 0.50 |
| V | 0.008 to 0.010 | 0.008 to 0.010 | 0.008 to 0.010 | 0.008 to 0.010 |

*Amount of Cr is due to tramp amounts of Cr and is not intentionally added to electrode.

Again, as shown above, the level of chromium in the weld deposit is considerably lower than the requirements of the AWS specification (which is 0.40 max). However, the weld deposit strength is not compromised because of a balance achieved between elements of the weld deposit. Namely, carbon, manganese, molybdenum, nickel, silicon and venedium.

By using electrodes in accordance with the present invention, chromium levels in undiluted weld deposits can be below 0.20% by weight. By using additional embodiments, chromium levels can be below 0.10% by weight, and as shown in the table above may be below 0.06% by weight. Moreover, it is contemplated that if the tramp levels of chromium can be eliminated from the base materials used in the manufacture of the electrode 300, the level of chromium in the undiluted weld deposit can approach 0%. However, as discussed previously, because of the balance of components disclosed and set forth herein, the strength of the weld is not compromised such that at least the AWS E11018M, or appropriate military specifications, are satisfied.

The present invention has been described with certain embodiments and applications. These can be combined and interchanged without departing from the scope of the invention as defined in the appended claims. The electrodes as defined in these appended claims are incorporated by reference herein as if part of the description of the novel features of the synergistic invention.

We claim:

1. A welding electrode used for high strength welding, wherein the electrode comprises:
   at least manganese, molybdenum, nickel, and carbon,
   the amount of carbon being in the range of 0.8 to 1.5% by weight;
   the amount of nickel being in the range of 1.2 to 2.0% by weight;
   the amount of molybdenum being in the range of 0.01 to 0.5% by weight;
   and the amount of manganese being in the range of 1.5 to 2.0% by weight,
wherein the ratio of manganese to molybdenum in the electrode is maintained in the range of 4-8 to 1; with no addition of chromium such that any tramp amount of chromium in the electrode provides an undiluted weld deposit having no more than 0.20% by weight of chromium with a balance of alloys in the weld deposit having an amount of carbon in the range of 0.04 to 0.06% by weight and a weld deposit manganese to molybdenum ratio of 2-7 to 1 so as to define a carbon equivalent of the weld deposit ranging from 0.15-0.35 and having an ultimate tensile strength of at least 110 ksi and a 0.2% yield strength in the range of 85 to 125 ksi, when welded with a heat input in the range of about 30 KJ/in to about 60 KJ/in; and the welding electrode has a diameter of at least 3/32 inch.

2. The welding electrode of claim 1, wherein the yield strength is in the range of 98 to 110 ksi.

3. The welding electrode of claim 1, wherein the welding electrode provides no more than 0.10% by weight of chromium in the weld deposit.

4. The welding electrode of claim 3, wherein the welding electrode provides no more than 0.06% by weight of chromium in the weld deposit.

5. The welding electrode of claim 1, wherein the electrode comprises a core wire and a coating surrounding the core wire.

6. The welding electrode of claim 5, wherein the coating of the electrode is in the range of 32 to 48% of the electrode.

7. The welding electrode of claim 1, wherein the electrode provides a balance of alloys in the weld deposit including an amount of manganese in the range of 1.5 to 2.25% by weight in the weld deposit.

8. The welding electrode of claim 1, wherein the electrode provides a balance of alloys in the weld deposit including an amount of molybdenum in the range of 0.35 to 0.5% by weight in the weld deposit.

9. The welding electrode of claim 1, wherein the electrode provides a balance of alloys in the weld deposit including an amount of nickel in the range of 1.75 to 2.75 % by weight in the weld deposit.

10. A welding electrode used for high strength welding, wherein the electrode comprises:
   a core wire; and
   an electrode coating surrounding the core wire,
   the electrode coating containing at least manganese, molybdenum, nickel, and carbon,
   the amount of carbon being in the range of 2.5 to 3.0% by weight;
   the amount of nickel being in the range of 2.7 to 5.0% by weight;
   the amount of molybdenum being in the range of 0.5 to 1.2% by weight;
   and the amount of manganese being in the range of 3.0 to 4.5% by weight,
wherein the ratio of manganese to molybdenum in the electrode is maintained in the range of 4-8 to 1; with no addition of chromium such that any tramp amount of chromium in the electrode provides an undiluted weld deposit having no more than 0.20% by weight of chromium with a balance of alloys in the weld deposit having an amount of carbon in the range of 0.04 to 0.06% by weight and a weld deposit manganese to molybdenum ratio of 2-7 to 1 so as to define a carbon equivalent of the weld deposit ranging from 0.15-0.35 and having an ultimate tensile strength of at least 110 ksi and a 0.2% yield strength in the range of 85 to 125 ksi, when welded with a heat input in the range of about 30 KJ/in to about 60 KJ/in; and the welding electrode has a diameter of at least 3/32 inch.

11. The welding electrode of claim 10, wherein the yield strength is in the range of 98 to 110 ksi.

12. The welding electrode of claim 10, wherein the welding electrode provides no more than 0.10% by weight of chromium in the weld deposit.

13. The welding electrode of claim 12, wherein the welding electrode provides no more than 0.06% by weight of chromium in the weld deposit.

14. The welding electrode of claim 10, wherein the coating of the electrode is in the range of 32 to 48% of the electrode.

15. The welding electrode of claim 10, wherein the electrode provides a balance of alloys in the weld deposit including an amount of manganese in the range of 1.5 to 2.25% by weight in the weld deposit.

16. The welding electrode of claim 10, wherein the electrode provides a balance of alloys in the weld deposit including an amount of molybdenum in the range of 0.35 to 0.5% by weight in the weld deposit.

17. The welding electrode of claim 10, wherein the electrode provides a balance of alloys in the weld deposit including an amount of nickel in the range of 1.75 to 2.75% by weight in the weld deposit.

18. The welding electrode of claim 1, wherein the electrode provides a balance of alloys including an amount of vanadium in the range of 0.005 to 0.010% by weight in the weld deposit.

19. The welding electrode of claim 10, wherein the electrode provides a balance of alloys including an amount of vanadium in the range of 0.005 to 0.010% by weight in the weld deposit.

20. The welding electrode of claim 1, wherein the electrode provides a balance of alloys including an amount of silicon in the range of 0.30 to 0.75% by weight in the weld deposit.

21. The welding electrode of claim 10, wherein the electrode provides a balance of alloys including an amount of in the range of 0.30 to 0.75% by weight in the weld deposit.

22. The welding electrode, of claim 1, wherein the electrode provides a balance of alloys including:
   an amount of manganese in the range of 1.5 to 2.25% by weight in the weld deposit;
   an amount of molybdenum in the range of 0.35 to 0.5% by weight in the weld deposit
   an amount of nickel in the range of 1.75 to 2.75% by weight in the weld deposit;
   an amount of vanadium in the range of 0.005 to 0.010% by weight in the weld deposit; and
   an amount of silicon in the range of 0.30 to 0.75% by weight m the weld deposit.

23. The welding electrode of claim 10, wherein the electrode provides a balance of alloys including:
   an amount of manganese in the range of 1.5 to 2.25% by weight in the weld deposit;
   an amount of molybdenum in the range of 0.35 to 0.5% by weight in the weld deposit
   an amount of nickel in the range of 1.75 to 2.75% by weight in the weld deposit;
   an amount of vanadium in the range of 0.005 to 0.010% by weight in the weld deposit; and
   an amount of silicon in the range of 0.30 to 0.75% by weight in the weld deposit.

24. The welding electrode of claim 10, wherein the core wire contains at least manganese, molybdenum, nickel, and carbon,
   the amount of carbon being in the range of 0.06 to 0.08% by weight of the core wire;
   the amount of nickel being up to 0.05% by weight of the core wire;
   the amount of molybdenum being up to 0.02% by weight of the core wire;
   the amount of manganese being in the range of 0.45 to 0.55% by weight of the core wire.

25. The welding electrode of claim 10, wherein the core wire has a diameter being any one of 3/32"; 1/8"; 5/32" and 3/16".

26. The welding electrode of claim 1, wherein the electrode comprises a core wire and a coating surrounding the core wire, the electrode having one of:
   (a) a diameter of 3/32 inch with the coating being 42-48% by weight of the electrode;
   (b) a diameter of 1/8 inch with the coating being 37.5-43.5% by weight of the electrode;
   (c) a diameter of 5/32 inch with the coating being 34-39% by weight of the electrode; and
   (d) a diameter of 3/16 inch with the coating being 32-38% by weight of the electrode.

* * * * *

UNITED STATES PATENT AND TRADEMARK OFFICE
CERTIFICATE OF CORRECTION

| | | |
|---|---|---|
| PATENT NO. | : 8,269,144 B2 | Page 1 of 1 |
| APPLICATION NO. | : 11/466917 | |
| DATED | : September 18, 2012 | |
| INVENTOR(S) | : Ashish Kapoor | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1198 days.

Signed and Sealed this
Nineteenth Day of August, 2014

Michelle K. Lee
*Deputy Director of the United States Patent and Trademark Office*